(12) United States Patent
Swamy et al.

(10) Patent No.: US 8,179,701 B2
(45) Date of Patent: May 15, 2012

(54) VARIABLE FREQUENCY DRIVE SOFT CHARGE CIRCUIT

(75) Inventors: Mahesh M. Swamy, Gurnee, IL (US); Tsuneo Joe Kume, Kitakyushu (JP)

(73) Assignee: Yaskawa America, Inc., Waukegan, IL (US)

( * ) Notice: Subject to any disclaimer, the term of this patent is extended or adjusted under 35 U.S.C. 154(b) by 498 days.

(21) Appl. No.: 12/459,718

(22) Filed: Jul. 7, 2009

(65) Prior Publication Data
US 2011/0007530 A1    Jan. 13, 2011

Related U.S. Application Data

(60) Provisional application No. 61/204,654, filed on Jan. 9, 2009.

(51) Int. Cl.
*H02M 5/458* (2006.01)
(52) U.S. Cl. .......................................................... 363/37
(58) Field of Classification Search .................. 363/34, 363/37
See application file for complete search history.

(56) References Cited

U.S. PATENT DOCUMENTS

| | | | | |
|---|---|---|---|---|
| 3,568,021 A | * | 3/1971 | Turnbull | 318/808 |
| 4,307,442 A | * | 12/1981 | Yano et al. | 363/51 |
| 4,394,720 A | * | 7/1983 | Gabor | 363/37 |
| 4,458,306 A | * | 7/1984 | Galloway et al. | 363/27 |
| 4,521,840 A | * | 6/1985 | Hoadley | 363/35 |
| 4,638,138 A | * | 1/1987 | Rosa et al. | 363/37 |
| 4,652,985 A | * | 3/1987 | Bougle | 363/37 |
| 4,685,042 A | * | 8/1987 | Severinsky | 363/41 |
| 4,788,635 A | * | 11/1988 | Heinrich | 363/35 |
| 4,967,333 A | * | 10/1990 | Callier et al. | 363/37 |
| 5,075,838 A | * | 12/1991 | Schnetzka et al. | 363/37 |
| 7,227,330 B2 | | 6/2007 | Swamy et al. | |
| 7,336,052 B2 | * | 2/2008 | Grbovic | 318/800 |
| 7,593,244 B2 | * | 9/2009 | Sodo et al. | 363/47 |
| 2004/0095784 A1 | * | 5/2004 | Zhou | 363/37 |
| 2008/0068870 A1 | * | 3/2008 | Eguchi et al. | 363/37 |
| 2008/0246336 A1 | * | 10/2008 | Fishman et al. | 307/31 |
| 2009/0237961 A1 | * | 9/2009 | Sakakibara et al. | 363/37 |
| 2010/0172161 A1 | * | 7/2010 | Tallam et al. | 363/37 |
| 2011/0007530 A1 | * | 1/2011 | Swamy et al. | 363/37 |
| 2011/0038185 A1 | * | 2/2011 | Swamy et al. | 363/34 |

FOREIGN PATENT DOCUMENTS

JP    2005-6419    1/2005

OTHER PUBLICATIONS

Wijenayake, Gilmore, Lukaszewski, Anderson & Waltersdorf, "Modeling and Analysis of Shared/Common DC Bus Operation of AC Drives (Part I)", IEEE Industry Application Society Annual Meeting, New Orleans, Louisiana, Oct. 5-9, 1997.

* cited by examiner

*Primary Examiner* — Jeffrey Sterrett
(74) *Attorney, Agent, or Firm* — Wood, Phillips, Katz, Clark & Mortimer

(57) ABSTRACT

A variable frequency drive comprises a diode rectifier receiving multiphase AC power and converting the AC power to DC power. An inverter receives DC power and converts the DC power to AC power to drive a load. A link circuit is connected between the diode rectifier and the inverter and comprises a DC bus to provide a relatively fixed DC voltage for the inverter. A link capacitor is across the bus. A soft charge circuit limits in rush current to the link capacitor. The soft charge circuit comprises an inductor in the bus and a resistor assist circuit across the inductor along with an anti-parallel clamping thyristor reverse connected also across the inductor.

19 Claims, 5 Drawing Sheets

VARIABLE FREQUENCY DRIVE SOFT CHARGE CIRCUIT

This application claims priority of U.S. Application No. 61/204,654 filed Jan. 9, 2009.

FIELD OF THE INVENTION

The present invention relates to variable frequency drives and, more particularly, to a soft charge circuit including an inductor and a resistor assist circuit.

BACKGROUND OF THE INVENTION

AC to DC rectifiers are widely used to convert AC line electric power to DC power to be used by inverters (for motor, UPS, and other applications), DC/DC converters, and passive loads such as resistors. In any rectifier circuit, the AC line voltages are rectified and ripple of the rectified voltage is filtered using a parallel capacitor and occasionally a series inductor. This results in a fixed, i.e., ripple free, DC voltage.

Without appropriate pre-charge circuitry, the start-up transients can be harmful to the systems. If the AC line and/or the DC link filters do not have sufficient impedance, significant switching transient may occur upon closing a three-phase supply switch. A large current surge charges the capacitor and depending on the system impedance, the surge current can reach prohibitive levels. As a result, the rectifier switches and the filter components (inductors and DC link capacitor) may fail due to the excessive current/voltage through them. The transients may also create electromagnetic interference that may interfere with other equipment in the power system and can lead to a catastrophic failure. Therefore, during start-up it is mandatory to establish a high impedance path between the large AC line voltages and the DC link capacitor. This task can be accomplished by a pre-charge or soft charge circuit that is placed in series with the DC link output of the rectifier. The main task of the soft charge circuit is to exhibit sufficiently high impedance during start-up and zero impedance during normal operation.

Known voltage source inverters (VSI) that have a large DC link capacitor filter use a resistor-contactor arrangement to limit the inrush current into the capacitors, and thereby provide a means to soft-charge the DC link capacitor $C_{DC}$, see FIG. 1(a). Because of the mechanical nature of the contactor, the reliability of the variable frequency drive (VFD) is adversely affected. Moreover, the time delay involved in the basic response of the contactor can result in an unfavorable sequence of events during a brown out condition. Given these facts, the soft-charge circuit is often considered to be the weakest part of an otherwise well designed VFD.

The typical prior art VFD system shown in FIG. 1(a) employs the soft charge circuit including a resistor $R_{SC}$ and a contactor switch MC connected in parallel. The resistor $R_{SC}$ is sized for the start-up charging transient while the contactor switch MC is sized for the normal operation. During start-up the contactor switch MC is open (not conducting) and it remains so until the DC link capacitor voltage reaches a critical value (roughly near rated operating voltage). Once the critical voltage level is reached, then the contactor switch MC is closed, and the resistor $R_{SC}$ is by-passed.

The rectifier system of FIG. 1(a) exhibits high energy-efficiency because the contactor switch MC has very low conduction losses and the large pre-charge transients are limited to less harmful levels. If for any reason the input AC supply experiences a large dip either due to brown out condition or due to a large load being suddenly applied across the AC supply, there is a possibility that the soft-charge contactor does not open and remains closed. When the input AC supply recovers, the resulting surge current can be large and damage the input rectifiers, and the DC link capacitor. When large current flows through the soft charge resistor during such events, the contacts can even melt and fuse together, rendering them useless for future use. Hence, by nature, this approach does not yield a highly reliable solution. Also, due to mechanical actuation, the mechanical contactor switch wear-out is rapid and inevitable. Therefore, the life of the contactor is limited and in general much shorter than most of the stationary electrical parts inside a rectifier system.

There have been suggestions of replacing the magnetic contactor MC in FIG. 1(a) with a semiconductor switch, as shown in FIG. 1(b). However, the semiconductor switch requires intelligent control logic circuitry and is associated with steady-state power loss.

Thyristor controlled rectifiers have been used in VFDs but the additional gate circuit adds cost and increases the component count, which reduces reliability. With one known topology, the input rectifiers are replaced by thyristors. The triggering angle of the thyristors is controlled in such a manner that the DC link capacitor charges up smoothly with no inrush. When a brown out occurs, the thyristor angle is such that it provides the maximum output voltage possible, similar to a typical diode bridge. When the voltage recovers after a brown out condition, the difference between the peak value of the input voltage and the DC link voltage is large enough to force the triggering angle to increase and thereby reduce the high inrush current. The technique, shown in FIG. 2, is well established and is used by some VFD manufacturers. However, this VFD needs six pack thyristor modules, which can be expensive, especially for small sizes due to low volume of production by semiconductor manufacturers. The VFD needs six gate-trigger circuits along with sensing and decision making logic (The trigger circuits along with the necessary logic occupy space and are expensive). The thyristors may cause a voltage notching effect if the regulated output voltage is lower than that achievable from the input ac source—this will require the use of input ac inductor that occupies space and is an added cost. Finally, gate drive and logic circuits reduce mean time between failures (MTBF) due to the increased component count in the VFD.

A second alternative topology uses a Magneto Resistive (MR) device that shows high resistance under the influence of large magnetic field and low resistance when the magnetic field resets to a lower level. The MR element could be connected in series with the DC link capacitor to soft charge it at start up or during the recovery time after a brown out condition. The circuit configuration is shown in FIG. 3(a) and the conceptual schematic in FIG. 3(b).

The present invention is directed to solving the problems discussed above, in a novel and simple manner.

SUMMARY OF THE INVENTION

In accordance with the invention, there is provided a variable frequency drive with a DC link inductor and resistor assist circuit to soft charge a DC link capacitor.

Broadly, there is disclosed in accordance with one aspect of the invention, a voltage source inverter comprising a rectifier circuit for receiving multiphase AC power and converting the AC power to DC power. An inverter circuit receives DC power and converts the DC power to AC power. A link circuit is connected between the rectifier circuit and the inverter circuit and comprises a DC bus to provide a relatively fixed DC voltage for the inverter. A link capacitor is across the bus.

A soft charge circuit limits inrush current to the link capacitor. The soft charge circuit comprises an inductor in the bus and the resistor assist circuit across the inductor.

It is a feature of the invention that the resistor assist circuit comprises a bypass resistor in series with a forward assist thyristor. Series connected first and second resistors are across the inductor. A junction of the first and second resistors is connected to a gate of the forward assist thyristor.

It is another feature of the invention that the soft charge circuit further comprises an anti-parallel clamping thyristor reverse connected across the inductor. Series connected first and second resistors are across the inductor. The junction of the first and second resistors is connected to a gate of the anti-parallel clamping thyristor.

It is a further feature of the invention to provide a discharge resistor connected across the link capacitor.

It is another feature of the invention that the rectifier circuit comprises a diode rectifier.

There is disclosed in accordance with another aspect of the invention a variable frequency drive comprising a diode rectifier receiving multiphase AC power and converting the AC power to DC power. An inverter receives DC power and converts the DC power to AC power to drive a load. A link circuit is connected between the diode rectifier and the inverter and comprises a DC bus to provide a relatively fixed DC voltage for the inverter. A link capacitor is across the bus. A soft charge circuit limits inrush current to the link capacitor. The soft charge circuit comprises an inductor in the bus and a resistor assist circuit across the inductor.

There is disclosed in accordance with a further aspect of the invention a soft charge circuit for a diode rectifier front end variable frequency drive comprising a DC bus having a positive rail and a negative rail to provide a relatively fixed DC voltage. A link capacitor is across the bus. An inductor is in the positive rail. A resistor assist circuit is across the inductor.

Further features and advantages of the invention will be readily apparent from the specification and the drawing.

DETAILED DESCRIPTION OF THE INVENTION

The present invention uses alternative techniques to soft charge a DC link capacitor. The technique does not use mechanical contactors and should be able to handle brown out conditions in an efficient manner. Autonomous operation is provided, i.e., without any control logic, to handle various power supply conditions. Lastly, the resulting drive unit should be compact and economical. An exemplary topology in accordance with the invention, shown in FIG. 4, generally satisfies these target features. A DC link inductor with a resistor assist circuit is employed to soft charge the DC link capacitor. An assist resistor has a series thyristor.

Figure 1A:
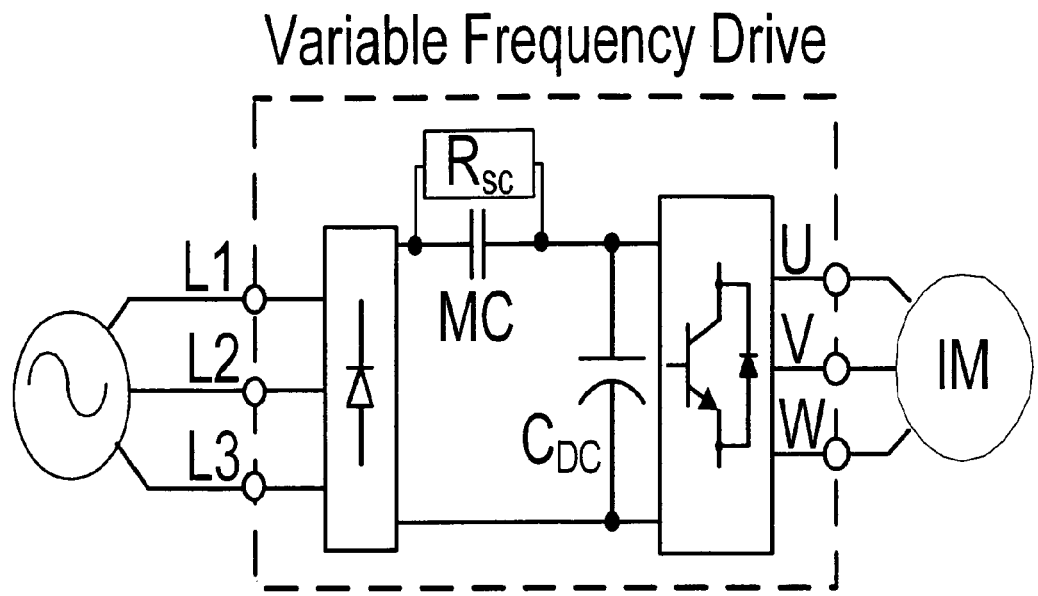
FIG. 1(a) is a generalized schematic of a prior art variable frequency drive.
Figure 1B:
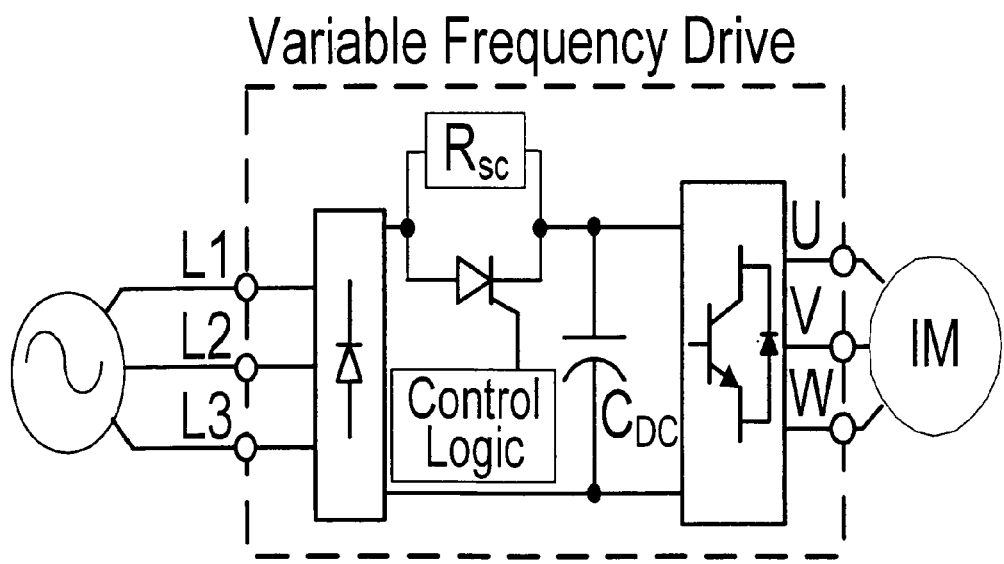
FIG. 1(b) is a generalized schematic of a prior art variable frequency drive.
Figure 2:
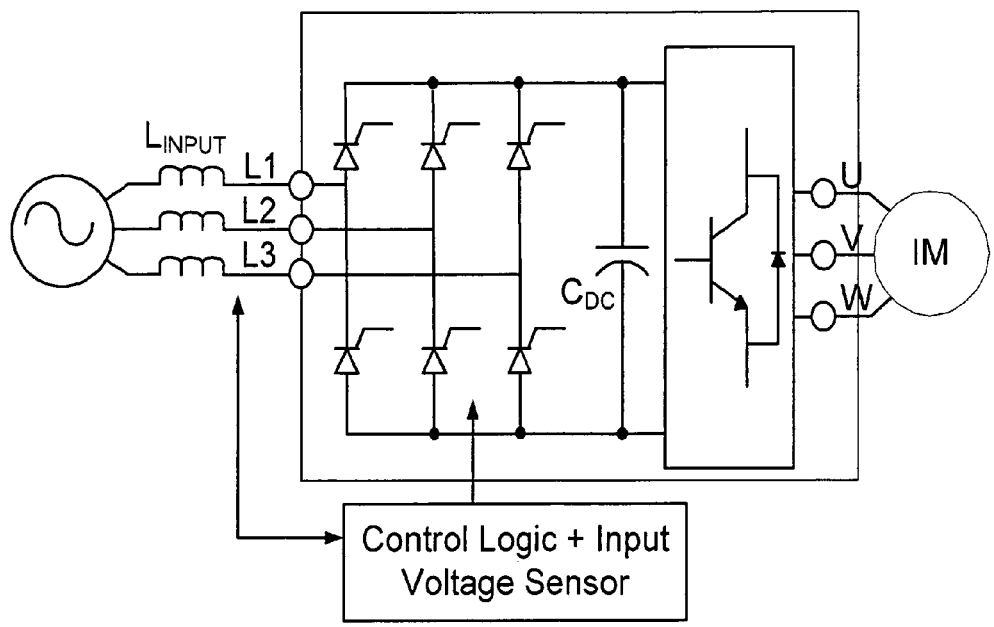
FIG. 2 is a generalized schematic of a prior art variable frequency drive.
Figure 3:
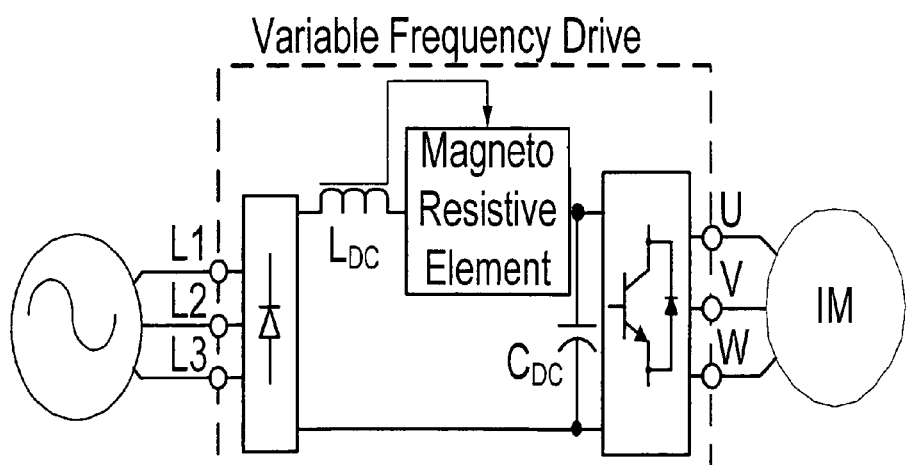
FIG. 3(a) is a generalized schematic of a prior art variable frequency drive.
FIG. 3(b) is a generalized diagram of a magnetoresistive element used in the drive of FIG. 3(a)
Figure 3B:
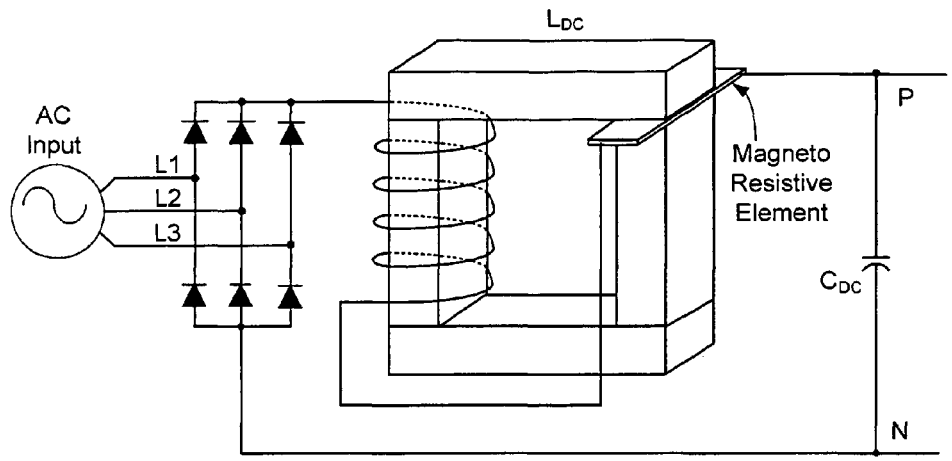
Figure 4:
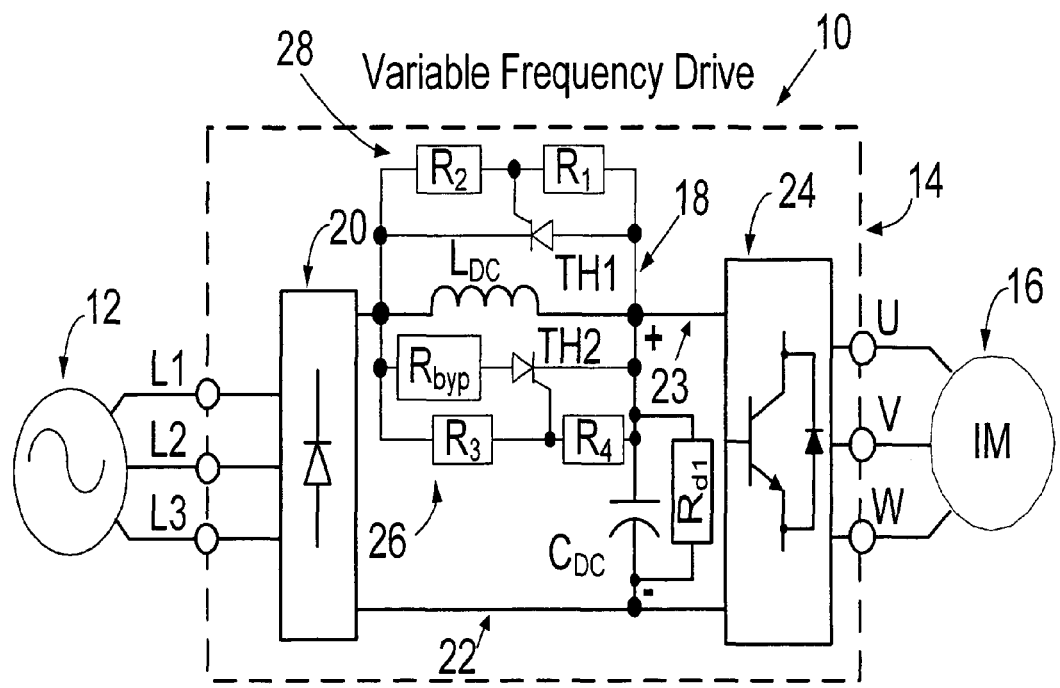
FIG. 4 is a schematic diagram of a variable frequency drive in accordance with the invention.

Referring particularly to FIG. 4, a motor drive system 10 is illustrated. The motor drive system 10 includes an AC source 12 and a variable frequency drive (VFD) 14 for driving an induction motor 16. As is known, a control unit (not shown) would be used for controlling the variable frequency drive. However, such control unit is not shown herein as it does not itself form part of the invention. Instead, the invention relates particularly to a soft charge circuit 18, described below.

The AC source 12 may comprise a drive or the like developing three phase AC power on feeder conductors labeled L1, L2 and L3. The VFD 14, as described more particularly below, converts the AC power to DC power and converts it back to AC power at a select frequency which is then impressed across terminals U, V and W. The terminals U, V and W are connected to feeder conductors to drive the motor 16, as is known.

The VFD 14 includes an AC/DC converter 20 connected by a DC link circuit 22 to a DC/AC converter 24. In an illustrative embodiment of the invention, the AC/DC converter 20 comprises a full wave bridge rectifier circuit of conventional construction which is operable to convert three phase AC power to DC power. Particularly, the AC/DC converter 20 comprises a diode rectifier. The DC link circuit 22 comprises a DC bus 23 defined by rails labeled "+" and "−". A DC link capacitor $C_{DC}$ is connected across the bus 23. A discharge resistor $R_{d1}$ is connected across the DC link capacitor $C_{DC}$. The DC/AC converter 24 comprises an inverter section. Typically, the inverter section comprises a pulse width modulation inverter using solid state switching devices connected in a three phase bridge configuration to the DC bus 23 to develop power at the terminals U, V and W. The switches are pulsed width modulated by control signals using a conventional control scheme. Particularly, the PWM inverter 24 is controlled to create a sinusoidal effect for the induction motor 16. The pulse frequency is typically fixed. The pulse width is varied to very sinusoidal frequency.

As will be apparent, the soft charge circuit 18 in accordance with the invention is not limited to use with any particular AC/DC converter and/or DC/AC converter.

The soft charge circuit 18 comprises a link inductor $L_{DC}$ in the +rail. A resistor assist circuit 26 is connected across the link inductor $L_{DC}$. A clamping circuit 28 is also connected across the link inductor $L_{DC}$. The clamping circuit 28 comprises an anti-parallel clamping thyristor TH1 connected across the inductor $L_{DC}$ in a direction facing away from the DC link capacitor $C_{DC}$. A voltage divider comprising series resistors $R_1$ and $R_2$ is connected across the anti-parallel clamping thyristor TH1 with a junction therebetween connected to a gate of the thyristor TH1. The resistor assist circuit 26 comprises a bypass resistor $R_{byp}$ connected in series with a forward assist thyristor TH2 across the inductor $L_{DC}$. A voltage divider comprising series resistors $R_3$ and $R_4$ is also connected across the inductor $L_{DC}$ with a junction therebetween connected to a gate of the forward assist thyristor TH2.

As described more particularly below, the resistors $R_1$ and $R_2$ control the turn on and turn off of the anti-parallel clamping thyristor TH1. The resistors $R_3$ and $R_4$ control the turn on and off of the forward assist thyristor TH2. Particularly, the resistors $R_1$-$R_4$ are used to control the soft charge circuit 18 without the use of a separate logic or control circuit. When inrush current flows through the inductor $L_{DC}$, the voltage across the inductor $L_{DC}$ is divided across the voltage divider resistors based on their values, as is apparent. These voltages turn the corresponding thyristors on or off. The resistance values are selected so that only a trickle current flows through the resistors so the wattage ratings may be low. In an exemplary embodiment of the invention, the resistors $R_2$ and $R_4$ have a value of about 900 ohms. The resistor $R_1$ has a value of 100 ohms and the resistor $R_3$ has a value of 16 ohms. As is apparent, the particular resistance values may be different according to a particular desired operation.

When AC power is applied to the VFD 14 shown in FIG. 4, an inrush current begins to flow, assuming that the DC link capacitor $C_{DC}$ has no initial stored voltage. The inrush current is divided into two distinct paths. The first path is through the bypass resistor $R_{byp}$ and series connected forward assist thyristor TH2 and the second path is through the DC link inductor, $L_{DC}$. The current through the resistor-thyristor path is initially higher and quicker than that through the link inductor $L_{DC}$ since the inductor delays the build up of current through it. The DC link capacitor $C_{DC}$ starts to charge, with the resistor-thyristor path providing as much charging as possible. The second charging path, through the link inductor $L_{DC}$, creates a resonant circuit. Due to the nature of an LC circuit, the voltage across the DC link capacitor $C_{DC}$ tends to increase over and above the peak value of the applied input AC voltage. At that time, the anti-parallel clamping thyristor TH1 experiences a forward bias and turns ON. The turning ON of the anti-parallel clamping thyristor TH1 causes the voltage across the inductor $L_{DC}$ to start falling and eventually turns OFF the forward assist thyristor TH2 in series with the bypass resistor $R_{byp}$, by reverse biasing the forward assist thyristor TH2. The inductor voltage linearly ramps to zero and is clamped by the anti-parallel clamping thyristor TH1. The voltage across the DC link capacitor $C_{DC}$ stops increasing since the inductor $L_{DC}$ is shorted and the DC link capacitor $C_{DC}$ gets connected to the output of the rectifier for the duration the anti-parallel clamping thyristor TH1 is ON. Eventually, the DC link capacitor $C_{DC}$ discharges into the discharge resistor $R_{d1}$ to a level dictated by the input voltage condition.

The important aspect of the resistor assist circuit 26 cannot be overlooked since the charging current flowing through the link inductor $L_{DC}$ is reduced due to the parallel resistor assist circuit 26. This reduces the stored energy in the link inductor $L_{DC}$. It also lowers the saturation current requirement and makes the link inductor $L_{DC}$ physically smaller. Due to the LC nature of the circuit, the voltage across the capacitor $C_{DC}$ is still higher than the peak value of the input voltage. The clamping circuit consisting of the anti-parallel clamping thyristor TH1 assures that the DC bus voltage is clamped to an acceptable value.

Figure 5A:
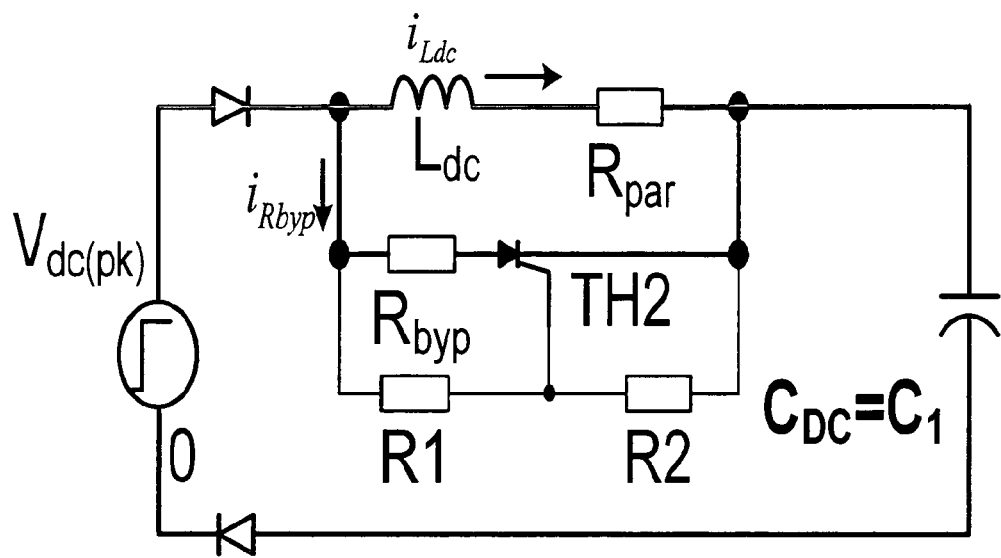
FIG. 5(a) is an equivalent circuit diagram for the drive of FIG. 4 during a first timing interval.
Figure 5B:
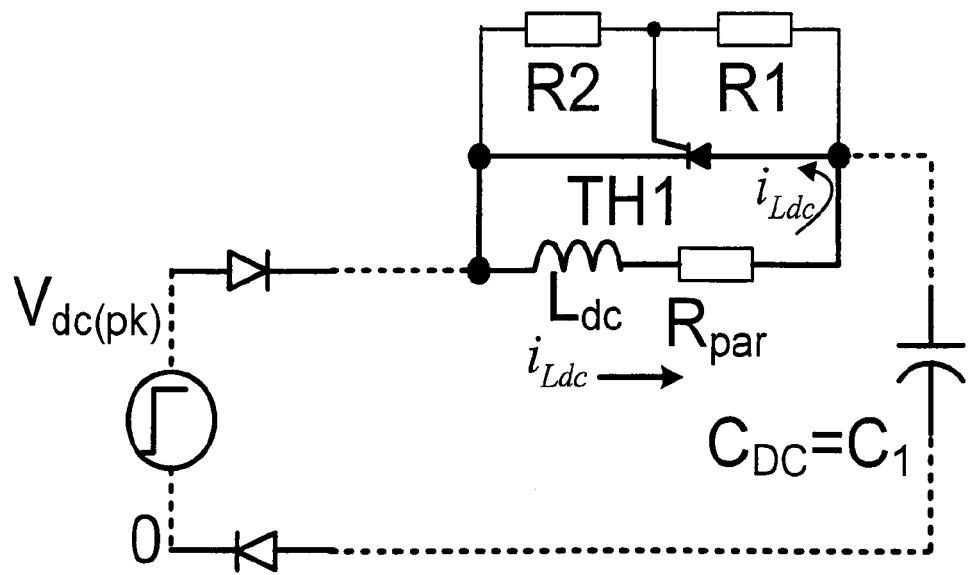
FIG. 5(b) is an equivalent circuit diagram for the drive of FIG. 4 during a second time interval.
Figure 6:
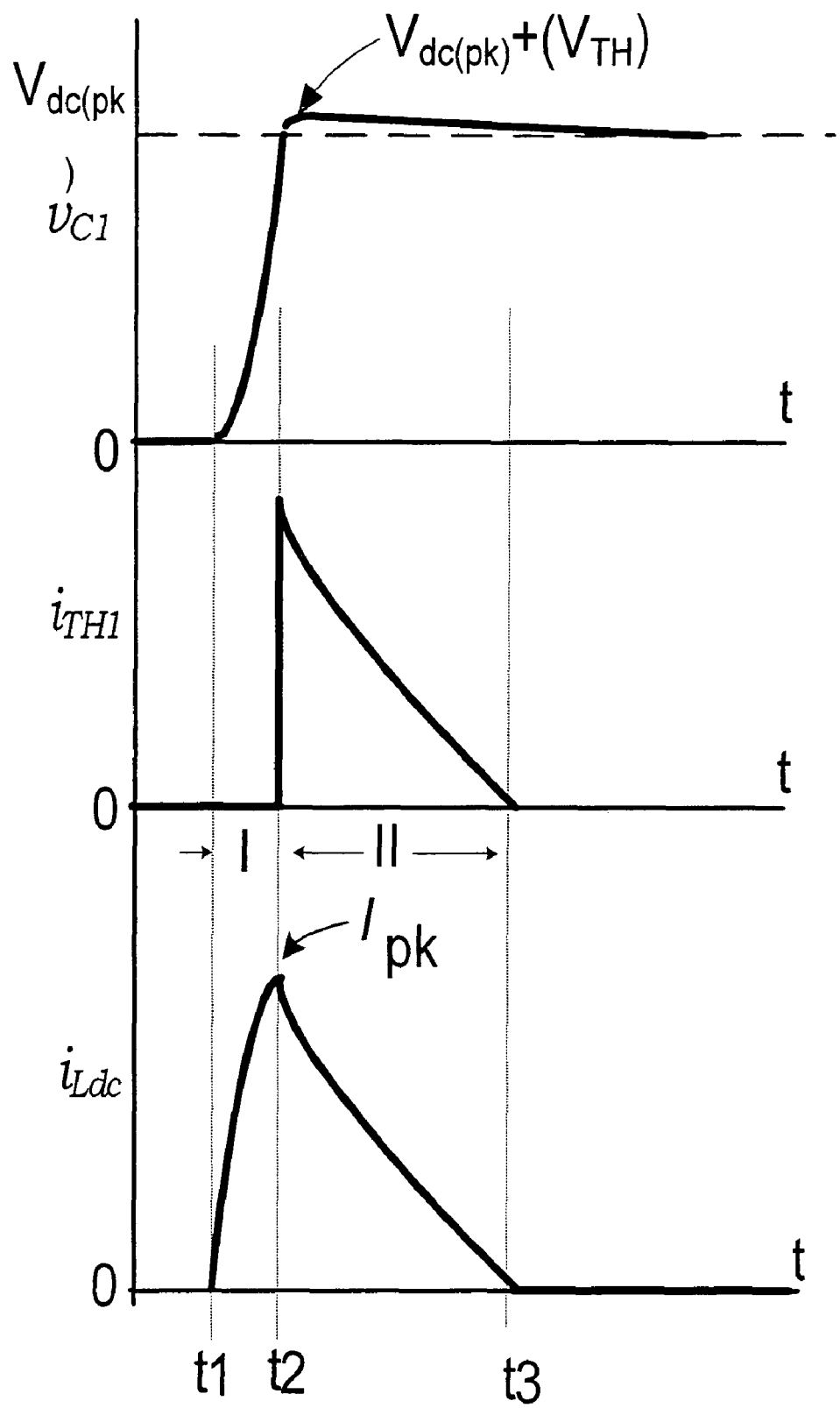
FIG. 6 is a series of theoretical wave forms illustrating operation of the variable frequency drive of FIG. 4.

Operation of the soft charge circuit 18 is now described with respect to timing intervals beginning at a time t1 when AC power is applied. FIGS. 5(*a*) and 5(*b*) illustrate equivalent circuit diagrams during select time intervals and FIG. 6 illustrates curves for DC bus voltage $V_{C1}$, thyristor current $i_{TH1}$ and inductor current $i_{Ldc}$.

Referring to FIGS. 5(*a*) and 6, interval 1 of operation begins at time t1 when the power is turned ON and the peak line-line voltage is applied to the link circuit 22 and lasts until the voltage $V_{C1}$ across the DC capacitor $C_{DC}$, goes above the peak input voltage $V_{dc(pk)}$ at a time t2. During interval 1, two current paths exist—one through the bypass resistor $R_{byp}$ and the other through the DC link inductor $L_{DC}$. At end of interval 1, current through $R_{byp}$ goes to zero since the forward assist thyristor TH2 becomes reverse-biased.

The expression for capacitor current (iLDC+iR$_{byp}$) for zero initial capacitor voltage is:

$$i_{C1} = \frac{V_{dc(pk)}}{\sqrt{L_{dc}/C_1}} \sin(\omega_1 t) + \frac{V_{dc(pk)}}{R_{byp}} e^{-t/R_{byp}C_1}; \quad (1)$$

$$\omega_1 = \frac{1}{\sqrt{L_{dc} \cdot C_1}}$$

$$v_{C1} = V_{dc(pk)}(1 - \cos(\omega_1 t)) + V_{dc(pk)}\left(1 - e^{-t/R_{byp}C_1}\right) \quad (2)$$

$$v_{Ldc} = V_{dc(pk)} - v_{C1} = V_{dc(pk)}\left(\cos(\omega_1 t) + e^{-t/R_{byp}C_1} - 1\right) \quad (3)$$

Referring to FIGS. 5(*b*) and 6, interval II begins at time t2 when the anti-parallel clamping thyristor TH1 starts conducting and clamps the voltage at the DC link capacitor $C_{DC}$ to the rectifier output voltage. Interval II ends at time t3 when $i_{LDC}$ decays to zero.

$$0 = L_{dc} \cdot \frac{di_{Ldc}}{dt} + i_{Ldc} \cdot R_{par}; \quad (4)$$

$$i_{Ldc} = \frac{V_{dc(pk)}}{\sqrt{L_{dc}/C_1}} \cdot \left(e^{-\frac{R_{par} t}{L_{dc}}}\right) \quad (5)$$

$$v_{Ldc} = -V_{TH}; \, v_{C1} = V_{dc(pk)} + (V_{TH}) \quad (6)$$

Thereafter, normal operation continues until a subsequent startup cycle.

As described, the VFD 10 using the soft charge circuit 18 in accordance with the invention which does not require use of any mechanical contactors and can handle brown out conditions in an efficient manner. The soft charge circuit 18 uses autonomous operation without any separate control logic to handle various supply conditions. As a result, the overall unit is compact and economical.

We claim:

1. A voltage source inverter comprising:
   a rectifier circuit for receiving multi phase AC power and converting the AC power to DC power;
   an inverter circuit for receiving DC power and converting the DC power to AC power; and
   a link circuit connected between the rectifier circuit and the inverter circuit and comprising a DC bus to provide a relatively fixed DC voltage for the inverter, a link capacitor across the bus and a soft charge circuit to limit inrush current to the link capacitor, the soft charge circuit comprising an inductor in the bus and a resistor assist circuit across the inductor.

2. The voltage source inverter of claim 1 wherein the resistor assist circuit comprises a bypass resistor in series with a forward assist thyristor.

3. The voltage source inverter of claim 2 wherein the resistor assist circuit further comprises series connected first and second resistors across the inductor and a junction of the first and second resistors connected to a gate of the forward assist thyristor.

4. The voltage source inverter of claim 1 wherein the soft charge circuit further comprises an anti-parallel clamping thyristor connected across the inductor.

5. The voltage source inverter of claim 4 wherein the soft charge circuit further comprises series connected first and second resistors across the inductor and a junction of the first and second resistors connected to a gate of the anti-parallel clamping thyristor.

6. The voltage source inverter of claim 1 further comprising a discharge resistor connected across the capacitor.

7. The voltage source inverter of claim 1 wherein the rectifier circuit comprises a diode rectifier.

8. A variable frequency drive comprising:
a diode rectifier receiving multi phase AC power and converting the AC power to DC power;
an inverter for receiving DC power and converting the DC power to AC power to drive a load; and
a link circuit connected between the diode rectifier and the inverter and comprising a DC bus to provide a relatively fixed DC voltage for the inverter, a link capacitor across the bus and a soft charge circuit to limit inrush current to the link capacitor, the soft charge circuit comprising an inductor in the bus and a resistor assist circuit across the inductor.

9. The variable frequency drive of claim 8 wherein the resistor assist circuit comprises a bypass resistor in series with a forward assist thyristor.

10. The variable frequency drive of claim 9 wherein the resistor assist circuit further comprises series connected first and second resistors across the inductor and a junction of the first and second resistors connected to a gate of the forward assist thyristor.

11. The variable frequency drive of claim 8 wherein the soft charge circuit further comprises an anti-parallel clamping thyristor connected across the inductor.

12. The variable frequency drive of claim 11 wherein the soft charge circuit further comprises series connected first and second resistors across the inductor and a junction of the first and second resistors connected to a gate of the anti-parallel clamping thyristor.

13. The variable frequency drive of claim 8 further comprising a discharge resistor connected across the capacitor.

14. A soft charge circuit for a diode rectifier front end variable frequency drive comprising:
a DC bus having a positive rail and a negative rail to provide a relatively fixed DC voltage, a link capacitor across the bus, an inductor in the positive rail and a resistor assist circuit across the inductor.

15. The soft charge circuit of claim 14 wherein the resistor assist circuit comprises a bypass resistor in series with a forward assist thyristor.

16. The soft charge circuit of claim 15 wherein the resistor assist circuit further comprises series connected first and second resistors across the inductor and a junction of the first and second resistors connected to a gate of the forward assist thyristor.

17. The soft charge circuit of claim 14 further comprising an anti-parallel clamping thyristor connected across the inductor.

18. The soft charge circuit of claim 17 further comprising series connected first and second resistors across the inductor and a junction of the first and second resistors connected to a gate of the anti-parallel clamping thyristor.

19. The soft charge circuit of claim 14 further comprising a discharge resistor connected across the capacitor.

* * * * *